(12) United States Patent
Riddoch et al.

(10) Patent No.: US 8,219,712 B2
(45) Date of Patent: Jul. 10, 2012

(54) DYNAMIC RESOURCE ALLOCATION

(75) Inventors: David Riddoch, Cambridge (GB);
Steven Pope, Cambridge (GB)

(73) Assignee: Solarflare Communications, Inc.,
Irvine, CA (US)

( * ) Notice: Subject to any disclaimer, the term of this patent is extended or adjusted under 35 U.S.C. 154(b) by 739 days.

(21) Appl. No.: 11/662,527

(22) PCT Filed: Sep. 2, 2005

(86) PCT No.: PCT/IB2005/002639
§ 371 (c)(1),
(2), (4) Date: Sep. 28, 2007

(87) PCT Pub. No.: WO2006/027663
PCT Pub. Date: Mar. 16, 2006

(65) Prior Publication Data
US 2008/0189510 A1   Aug. 7, 2008

(30) Foreign Application Priority Data
Sep. 9, 2004 (GB) .................... 0420057.2

(51) Int. Cl.
*G06F 15/16* (2006.01)
*G06F 17/00* (2006.01)
*G06F 12/00* (2006.01)
(52) U.S. Cl. .............. 709/250; 707/600; 710/200
(58) Field of Classification Search .............. 709/250, 709/253, 217–229; 711/170; 707/104.1
See application file for complete search history.

(56) References Cited

U.S. PATENT DOCUMENTS

| 4,574,350 | A | * | 3/1986 | Starr ........................ 710/200 |
| 5,452,455 | A | | 9/1995 | Brown et al. |
| 5,671,442 | A | | 9/1997 | Feeney et al. |
| 6,070,219 | A | | 5/2000 | McAlpine et al. |
| 6,675,200 | B1 | | 1/2004 | Cheriton et al. |
| 2002/0032806 | A1 | | 3/2002 | Machin et al. |
| 2003/0065847 | A1 | | 4/2003 | Goodrum et al. |
| 2003/0225990 | A1 | | 12/2003 | Brown et al. |
| 2004/0010612 | A1 | | 1/2004 | Pandya |
| 2004/0054813 | A1 | | 3/2004 | Boucher et al. |
| 2005/0021558 | A1 | * | 1/2005 | Beverly et al. .......... 707/104.1 |
| 2005/0066108 | A1 | | 3/2005 | Zimmer et al. |

FOREIGN PATENT DOCUMENTS
EP    0 658 837    6/1995
(Continued)

OTHER PUBLICATIONS

Cramming more components onto integrated circuits, Electronics, vol. 38, No. 8, pp. 114-117, 1965, Gordon E. Moore, Apr. 19, 1965.

(Continued)

*Primary Examiner* — Ian N Moore
*Assistant Examiner* — Kiet Tang
(74) *Attorney, Agent, or Firm* — Weide & Miller, Ltd.

(57) ABSTRACT

A network interface device for providing an interface between a network and a data processing device, the network interface device having: a plurality of resources of different types for supporting the interface, and a bus interface for interfacing with the data processing device by means of a bus over which data can be sent by addressing to a address on the bus, the network interface device being arranged so that each resource may be addressed by a respective address on the bus.

20 Claims, 2 Drawing Sheets

| SUB-PAGE ADDRESS | RESOURCE ID | THREAD TAG | ROW |
|---|---|---|---|
| 00F0 | 01A0 | 0010 | 1 |
| 00F2 | 01A1 | 0010 | 2 |
| 00F4 | 01A2 | 0011 | 3 |
| ⋮ | ⋮ | ⋮ | ⋮ |

FOREIGN PATENT DOCUMENTS

| EP | 0 743 777 | 11/1996 |
|---|---|---|
| EP | 1 336 915 | 8/2003 |
| WO | WO 00/52869 | 9/2000 |
| WO | WO 2004/017220 | 2/2004 |
| WO | WO 2004/025477 | 3/2004 |

OTHER PUBLICATIONS

Programming Semantics for Multiprogrammed Computations, Communications of the ACM, vol. 9, No. 3, pp. 143-155, Jack B. Dennis and Earl C. Van Horn, Mar. 1966.

The Aloha System, ACM Computer Communication Review, vol. 4 No. 1, F.F. Kuo, Jan. 1974.

A Protocol for Packet Network Intercommunication, IEEE Transactions on Communications, vol. COM-22, No. 5, pp. 637-648, Vinton Cerf, Robert Kahn, May 1974.

Proposal for an International End-to-End Protocol, ACM Computer Communication Review, vol. 6 No. 1, p. 1-18, V. Cerf, et al., Jan. 1976.

Ethernet: distributed packet switching for local computer networks, Communications of the ACM, vol. 19, Issue 7, pp. 395-404, Robert M. Metcalfe and David R. Boggs, Jul. 1976.

Interrupt Driven Programming, Communications of the ACM, vol. 14, No. 6, p. 417-418, Marvin Zelkowits, Jun. 1971.

Synchronizing Processors with Memory-Content-Generated Interrupts, Communications of the ACM, vol. 16, No. 6, p. 350-351, J. Carver Hill, Jun. 1973.

Virtual cut-through: A new computer communication switching technique, Computer Networks, vol. 3, No. 4, pp. 267-286, P. Kermani and L. Kleinrock, Sep. 1979.

An Overview of the New Routing Algorithm for the ARPANET, Proceedings of the 6th Data Communications Symposium, p. 63, John M. McQuillan, et al., Nov. 1979.

Grapevine: An Exercise in Distributed Computing, Communications of the ACM, vol. 25, Issue 4, pp. 260-274, Andrew D. Birrell, et al., Apr. 1982.

The Architecture of the Universe Network, ACM Computer Communication Review, vol. 14, No. 2, pp. 2-9, Ian M. Leslie, et al., Jun. 1984.

Congestion Control in IP/TCP Internetworks, ACM Computer Communication Review, vol. 14, No. 4, p. 11-17, John Nagle, Oct. 1984.

Development of a TCP/IP for the IBM/370, ACM Computer Communication Review, vol. 15, No. 4, Robert M. Brandriff, et al., Sep. 1985.

Supercomputers on the Internet: A Case Study, ACM Computer Communication Review, vol. 17, No. 5, C. Kline, Aug. 1987.

Fragmentation Considered Harmful, ACM Computer Communication Review, vol. 17, No. 5, pp. 390-401, Christopher A. Kent, Jeffrey C. Mogul, Oct. 1987.

An Analysis of Memnet: An Experiment in High-Speed Shared-Memory Local Networking, ACM Computer Communication Review, vol. 18, No. 4, p. 165-174, Gary S. Delp, et al., Aug. 1988.

Measured Capacity of an Ethernet: Myths and Reality, ACM Computer Communication Review, vol. 18, No. 4, p. 222-234, David R. Boggs, et al., Aug. 1988.

The VMP Network Adapter Board (NAB): High-Performance Network Communication for Multiprocessors, ACM Computer Communication Review, vol. 18, No. 4, p. 175-187, H. Kanakia and D. Cheriton, Aug. 1988.

Congestion Avoidance and Control, ACM Computer Communication Review, vol. 18, No. 4, p. 314-329, V. Jacobson, Aug. 1988.

The Design Philosophy of the DARPA Internet Protocols, ACM Computer Communication Review, vol. 18, No. 4, pp. 106-114, David D. Clark, Aug. 1988.

Development of the Domain Name System, ACM Computer Communication Review, vol. 18, No. 4, pp. 123-133, Paul V. Mockapetris and Kevin J. Dunlap, Aug. 1988.

Performance Comparison of the Cray-2 and Cray X-MP/416 Supercomputers, Proceedings of the 1988 ACM/IEEE conference on Supercomputing, p. 288-295, Orlando, Florida, Margaret L. Simmons and Harvey J. Wasserman, Nov. 12, 1988.

Implementing TCP/IP on a Cray computer, ACM Computer Communication Review, vol. 19, No. 2, p. 11-15, David A. Borman, Apr. 1989.

Computing the Internet Checksum, ACM Computer Communication Review, vol. 19, No. 2, p. 86-94, R. Braden, et al., Apr. 1989.

An Analysis of TCP Processing Overhead, IEEE Communications Magazine, vol. 27, No. 6, pp. 23-29, David D. Clark, et al., Jun. 1989.

Sirpent: A High-Performance Internetworking Approach, ACM Computer Communication Review, vol. 19, No. 4, p. 158-169, David R. Cheriton, Sep. 1989.

Protocol Design for High Speed Networks, PhD Thesis, University of Cambridge, Derek Robert McAuley, Sep. 1989.

How Slow Is One Gigabit Per Second?, ACM Computer Communication Review, vol. 20, No. 1, p. 44-53, Craig Partridge, Jan. 1990.

Architectural Considerations for a New Generation of Protocols, ACM Computer Communication Review, vol. 20, No. 4, pp. 200-208, D. D. Clark and D. L. Tennenhouse, Sep. 1990.

Protocol Implementation on the Nectar Communication Processor, ACM Computer Communication Review, vol. 20, No. 4, p. 135-144, Eric C. Cooper, et al., Sep. 1990.

A Host-Network Interface Architecture for ATM, ACM Computer Communication Review, vol. 21, No. 4, Bruce S. Davie, Sep. 1991.

A High-Performance Host Interface for ATM Networks, ACM Computer Communication Review, vol. 21, No. 4, p. 317-325, C. Brendan S. Traw, Sep. 1991.

Fairisle: An ATM Network for the Local Area, ACM Computer Communication Review, vol. 21, No. 4, p. 327, Ian Leslie and Derek R. McAuley, Sep. 1991.

The Desk Area Network, ACM Operating Systems Review, vol. 25, Issue 4, p. 14-21, Mark Hayter and Derek McAuley, Oct. 1991.

An Integration of Network Communication with Workstation Architecture, ACM Computer Communication Review, vol. 21, No. 5, p. 18-29, 1991.

The Evolution of XTP, Proceedings of the Third International Conference on High Speed Networking,. Greg Chesson. Nov. 1991.

System support for multi-service traffic, University of Cambridge Computer Laboratory Technical Report No. 245, Michael J. Dixon, Jan. 1992.

ATOMIC: A Local Communication Network Created Through Repeated Application of Multicomputing Components, Made available by authors, Danny Cohen, Gregory Finn, Robert Felderman, Annette DeSchon, Jan. 10, 1992.

Message Authentication with One-Way Hash Functions, ACM Computer Communication Review, vol. 22, No. 5, pp. 29-38, Gene Tsudik, Oct. 1992.

Analyzing Communication Latency using the Nectar Communication Processor, ACM Computer Communication Review, vol. 22, No. 4, Peter Steenkiste, Oct. 1992.

Efficient Demultiplexing of Incoming TCP Packets, ACM Computer Communication Review, vol. 22, No. 4, Paul E. McKenney and Ken F. Dove, Oct. 1992.

TCP/IP on the Parallel Protocol Engine, Proceedings of the IFIP TC6/WG6.4 Fourth International Conference on High Performance Networking IV, Erich Ruetsche and Matthias Kaiserswerth, Dec. 14, 1992.

Hardware/Software organization of a high performance ATM host interface, IEEE Journal on Selected Areas in Communications, pp. 240-253, C. Traw and J. Smith, Feb. 1993.

The Architecture of Gb/s Multimedia Protocol Adapter, ACM Computer Communication Review, vol. 23, No. 3, E. Ruetsche, Jul. 1993.

Giving Applications Access to Gb/s Networking, IEEE Network, vol. 7, Issue 4, pp. 44-52, Jonathan M. Smith and C. Brendan S. Traw, Jul. 1993.

The Design and Evaluation of an Off-Host Communications Protocol Architecture, MSci Thesis, University of Virginia, Jeffrey R. Michel, Aug. 1993.

A Workstation Architecture to Support Multimedia, PhD Thesis, University of Cambridge, Mark David Hayter, Sep. 1993.

The Importance of Non-Data Touching Processing Overheads in TCP/IP, ACM Computer Communication Review, vol. 23, No. 4, pp. 259-268, Jonathan Kay and Joseph Pasquale, Oct. 1993.

On the Self-Similar Nature of Ethernet Traffic, ACM Computer Communication Review, vol. 23, No. 4, p. 85-95, W. E. Leland, et al., Oct. 1993.
Implementing Network Protocols at User Level, ACM Computer Communication Review, vol. 23, No. 4, C. A. Thekkath, et al., Oct. 1993.
A Programmable HIPPI Interface for a Graphics Supercomputer, Proceedings of the 1993 ACM/IEEE conference on Supercomputing, p. 452-461, Portland, Oregon, Raj K. Singh, et al., Nov. 15, 1993.
Fbufs: A High-Bandwidth Cross-Domain Transfer Facility, ACM Operating Systems Review, vol. 27, Issue 5, p. 189-202, Peter Druschel and Larry L. Peterson, Dec. 1993.
The Parallel Protocol Engine, IEEE/ACM Transactions on Networking, vol. 1, No. 6, p. 650-663, Matthias Kaiserswerth, Dec. 1993.
Protocol Service Decomposition for High-Performance Networking, ACM Operating Systems Review, vol. 27, Issue 5, p. 244-255, Chris Maeda, Brian Bershad, Dec. 1993.
ETA: Experience with an Intel Xeon Processor as a Packet Processing Engine, IEEE Micro, vol. 24, No. 1, p. 24-31, Greg Regnier, et al., Jan. 1994.
A Simple LAN Performance Measure, ACM Computer Communication Review, vol. 24, No. 1, pp. 7-11, J. Vis, Jan. 1994.
ATOMIC: A High-Speed Local Communication Architecture, Journal of High Speed Networks, Danny Cohen, Gregory Finn, Robert Felderman, and Annette DeSchon, Jan. 3, 1994.
Netstation Architecture Multi-Gigabit Workstation Network Fabric, Proceedings of InterOp '94, Las Vegas, Nevada, Gregory G. Finn and Paul Mockapetris, May 1994.
The Medusa Applications Environment, Proceedings of the International Conference on Multimedia Computing and Systems, p. 265-273, Boston, Stuart Wray, et al., May 1994.
MPI: A Message-Passing Interface Standard, Message-Passing Interface Forum, University of Tennessee, Knoxville, Various forum members, May 5, 1994.
A Programmable Network Interface for a Message-Based Multicomputer, ACM Computer Communication Review, vol. 24, No. 3, p. 8-17, Raj K. Singh, et al., Jul. 1994.
Experiences with a High-Speed Network Adaptor: A Software Perspective, ACM Computer Communication Review, vol. 24, No. 4, P. Druschel, et al., Oct. 1994.
TCP and Explicit Congestion Notification, ACM, ACM Computer Communication Review, vol. 24, No. 5, p. 8-23, Sally Floyd, Oct. 1994.
User-Space Protocols Deliver High Performance to Applications on a Low-Cost Gb/s Lan, ACM Computer Communication Review, vol. 24, No. 4, pp. 14-23, A. Edwards, et al., Oct. 1994.
TCP Vegas: New Techniques for Congestion Detection and Avoidance, ACM Computer Communication Review, vol. 24, No. 4, p. 24-35, L. S. Brakmo, et al., Oct. 1994.
The Dynamics of TCP Traffic over ATM Networks, ACM Computer Communication Review, vol. 24, No. 4, p. 79-88, A. Romanow and S. Floyd, Oct. 1994.
Experiences of Building an ATM Switch for the Local Area, ACM Computer Communication Review, vol. 24, No. 4, p. 158-167, R. J. Black, I. Leslie, and D. McAuley, Oct. 1994.
Application-Specific Protocols for User-Level Shared Memory, Proceedings of the 1994 conference on Supercomputing, pp. 380-389, Washington D.C., Babak Falsafi, et al., Nov. 14, 1994.
Performance of High-Speed Network I/O Subsystems: Case Study of A Fibre Channel Network, Proceedings of the 1994 conference on Supercomputing, Washington D.C., Mengjou Lin, et al., Nov. 14, 1994.
Myrinet: A Gigabit-per-Second Local-Area Network, Draft of paper published in IEEE Micro, vol. 15, No. 1, pp. 29-36, Nanette J. Boden, et al., Nov. 16, 1994.
Beowolf: A Parallel Workstation for Scientific Computation, Proceedings of the 24th International Conference on Parallel Processing, pp. 11-14, Thomas Sterling, et al., Aug. 1995.
Software Support for Outboard Buffering and Checksumming, ACM Computer Communication Review, vol. 25, No. 4, p. 87-98, K. Kleinpaste, P. Steenkiste, B. Zill,, Oct. 1995.

Performance of Checksums and CRCS over Real Data, ACM Computer Communication Review, vol. 25, No. 4, p. 68-76, C. Partridge, J. Hughes, and J. Stone, Oct. 1995.
Experiences Implementing a High-Performance TCP in User-Space, ACM Computer Communication Review, vol. 25, No. 4, A. Edward and S. Muir, Oct. 1995.
The Case for Persistent-Connection HTTP, ACM Computer Communication Review, vol. 25, No. 4, J. C. Mogul, Oct. 1995.
U-Net: A User-Level Network Interface for Parallel and Distributed Computing, ACM Operating Systems Review, vol. 29, Issue 5, p. 109-126, Thorsten von Eicken, et al., Dec. 1995.
Towards an Active Network Architecture, ACM Computer Communication Review, vol. 26, No. 2, pp. 15-20, D. L. Tennenhouse, and D. J. Wetherall, Apr. 1996.
Devices in a Multi-Service Operating System, PhD Thesis, University of Cambridge, Paul Ronald Barham, Jul. 1996.
Low-Latency Communication on the IBM RISC System/6000 SP, Gigabit Networking Workshop '97 Meeting, Kobe, Japan, Chi-Chao Chang, et al., Nov. 17, 1996.
Experiences with a Production Gigabit LAN, Gigabit Networking Workshop '97 Meeting, Kobe, Japan, Joe Touch, et al., Apr. 1997.
Host-based Routing Using Peer DMA, Gigabit Networking Workshop '97 Meeting, Kobe, Japan, Joe Touch, et al., Apr. 1997.
Report on the 5th IFIP Internation Workshop on Quality of Service (IWQOS 97), ACM Computer Communication Review, vol. 27, No. 3, pp. 100-117, O. Angin, et al., Jul. 1997.
Firefly: a Multiprocessor Workstation, ACM Operating Systems Review, vol. 21, Issue 4, p. 164-172, Charles P. Thacker and Lawrence C. Stewart, Oct. 1997.
Performance of the CRAY T3E Multiprocessor, Proceedings of the 1997 ACM/IEEE conference on Supercomputing, p. 1-17, San Jose, California, Ed Anderson, et al., Nov. 16, 1997.
Performance Evaluation of the SGI Origin2000: A Memory-Centric Characterization of LANL ASCI Applications, Proceedings of the 1997 ACM/IEEE conference on Supercomputing, p. 1-11, San Jose, California, Harvey J. Wassermann, et al., Nov. 16, 1997.
An Implementation and Analysis of the Virtual Interface Architecture, Proceedings of the 1998 ACM/IEEE conference on Supercomputing, p. 1-15, Orlando, Florida, Philip Buonadonna, et al., Nov. 7, 1998.
MPI-StarT: Delivering Network Performance to Numerical Applications, Proceedings of the 1998 ACM/IEEE conference on Supercomputing, p. 1-15, Orlando, Florida, Parry Husbands and James C. Hoe, Nov. 7, 1998.
Avalon: An Alpha/Linux Cluster Achieves 10 Gflops for $150k, Proceedings of the 1998 ACM/IEEE conference on Supercomputing, Orlando, Florida, Michael S. Warren, et al., Nov. 7, 1998.
Scaling of Beowulf-class Distributed Systems, Proceedings of the 1998 ACM/IEEE conference on Supercomputing, Orlando, Florida, John Salmon, et al., Nov. 7, 1998.
StarT-Voyager: A Flexible Platform for Exploring Scalable SMP Issues, Proceedings of the 1998 ACM/IEEE conference on Supercomputing, Orlando, Florida, Boon S. Ang, et al., Nov. 7, 1998.
Enhancing Distributed Systems with Low-Latency Networking, Parallel and Distributed Computing and Networks, Brisbane, Australia, S. L. Pope, et al., Dec. 1998.
Internet Vulnerabilities Related to TCP/IP and T/TCP, ACM Computer Communication Review, vol. 29, No. 1, pp. 81-85, M. de Vivo, et al., Jan. 1999.
TCP Byte Counting Refinements, ACM Computer Communication Review, vol. 29, No. 3, M. Allman, Jul. 1999.
Piglet: A Low-Intrusion Vertical Operating System, Technical Report MS-CIS-00-04, University of Pennsylvania, Steve Muir and Jonathan Smith, Jan. 2000.
Characterizing Processor Architectures for Programmable Network Interfaces, Proceedings of the 14th international conference on Supercomputing, pp. 54-65, Santa Fe, New Mexico, Patrick Crowley, et al., May 8, 2000.
When the CRC and TCP Checksum Disagree, ACM Computer Communication Review, vol. 30, No. 4, pp. 309-319, Jonathan Stone and Craig Partridge, Oct. 2000.

The Failure of TCP in High-Performance Computational Grids, Proceedings of the 2000 ACM/IEEE conference on Supercomputing, Dallas, Texas, W. Feng and P. Tinnakornsrisuphap, Nov. 4, 2000.

Architectural and Performance Evaluation of GigaNet and Myrinet Interconnects on Clusters of Small-Scale SMP Servers, Proceedings of the 2000 ACM/IEEE conference on Supercomputing, Dallas, Texas, Jenwei Hsieh, et al., Nov. 4, 2000.

Arsenic: A User-Accessible Gigabit Ethernet Interface, Proceedings of IEEE Infocom 2001, pp. 67-76, Ian Pratt and Keir Fraser, Apr. 22, 2001.

Deferred Segmentation for Wire-Speed Transmission of Large TCP Frames over Standard GbE Networks, Proceedings of the 9th Symposium on High Performance Interconnects, pp. 81, Bilic Hrvoye, et al., Aug. 22, 2001.

Presentation given at HOTT'01, 9th Symposium on High Performance Interconnects, Bilic Hrvoye, et al., Aug. 22, 2001.

Topology Discovery for Large Ethernet Networks, ACM Computer Communication Review, vol. 31, No. 4, Bruce Lowekamp, et al., Oct. 2001.

EMP: Zero-copy OS-bypass NIC-driven Gigabit Ethernet Message Passing, Proceedings of the 2001 ACM/IEEE conference on Supercomputing, pp. 57, Denver, Piyush Shivam, et al., Nov. 10, 2001.

A Case Study in Application I/O on Linux Clusters, Proceedings of the 2001 ACM/IEEE conference on Supercomputing, pp. 11, Denver, Robert Ross, et al., Nov. 10, 2001.

On Making TCP More Robust to Packet Reordering, ACM Computer Communication Review, vol. 32, No. 1, E. Blanton and M. Allman, Jan. 2002.

TCP Servers: Offloading TCP Processing in Internet Servers. Design, Implementation, and Performance, Technical Report DCR-TR-481, Computer Science Department, Rutgers University, Murali Rangarajan, et al., Mar. 2002.

ATM: A Retrospective on Systems Legacy, ACM Computer Communication Review, vol. 32, No. 5, Jon Crowcroft and Derek McAuley, Nov. 2002.

A Retrospective View of ATM, ACM Computer Communication Review, vol. 32, No. 5, pp. 13-19, Charles Kalmanek, Nov. 2002.

The Influence of ATM on Operating Systems, ACM Computer Communication Review, vol. 32, No. 5, pp. 29-37, Jonathan Smith, Nov. 2002.

An Overview of the BlueGene/L Supercomputer, Proceedings of the 2002 ACM/IEEE conference on Supercomputing, pp. 1-22, Baltimore, NR Adiga, et al., Nov. 16, 2002.

Ultra-High Performance Communication with MPI and the Sun Fire Link Interconnect, Proceedings of the 2002 ACM/IEEE conference on Supercomputing, p. 1-15, Baltimore, Steven J. Sistare and Christopher J. Jackson, Nov. 16, 2002.

Some Internet Architectural Guidelines and Philosophy, IETF Network Working Group, Request for Comments: 3439, R. Bush, D. Meyer, Dec. 2002.

F-RTO: An Enhanced Recovery Algorithm for TCP Retransmission Timeouts, ACM Computer Communication Review, vol. 33, No. 2, Pasi Sarolahti, et al., Apr. 2003.

Scalable TCP: Improving Performance in Highspeed Wide Area Networks, ACM Computer Communication Review, vol. 33, No. 2, pp. 83-91, Tom Kelly, Apr. 2003.

TCP offload is a dumb idea whose time has come, Proceedings of HotOS IX: The 9th Workshop on Hot Topics in Operating Systems, pp. 25-30, Jeffrey C. Mogul, May 18, 2003.

A case for Virtual Channel Processors, Proceedings of the ACM SIGCOMM 2003 Workshops, Derek McAuley and Rolf Neugebauer, Aug. 2003.

Initial End-to-End Performance Evaluation of 10-Gigabit Ethernet, Proceedings of the 11th Symposium on High Performance Interconnects, Justin Hurwitz and Wu-chun Feng, Aug. 20, 2003.

Workshop on network-I/O convergence: experience, lessons, implications (NICELI), ACM Computer Communication Review, vol. 33, No. 5, Vinay Aggarwal, et al., Oct. 2003.

Optimizing 10-Gigabit Ethernet for Networks of Workstations, Clusters, and Grids: A Case Study, Proceedings of the 2003 ACM/IEEE conference on Supercomputing, Phoenix, Arizona, Wu-chun Feng, et al., Nov. 15, 2003.

Performance Comparison of MPI Implementations over InfiniBand, Myrinet and Quadrics, Proceedings of the 2003 ACM/IEEE conference on Supercomputing, Phoenix, Arizona, Jiuxing Liu, et al., Nov. 15, 2003.

Architectural Characterization of TCP/IP Packet Processing on the Pentium M Processor, Proceedings of the 10th International Symposium on High Performance Computer Architecture, pp. 152, Srihari Makineni and Ravi Iyer, Feb. 14, 2004.

FAST TCP: Motivation, Architecture, Algorithms, Performance, Proceedings of IEEE Infocom, pp. 1246-1259, Cheng Jin, et al., Mar. 7, 2004.

TCP Offload to the Rescue, ACM Queue, vol. 2, No. 3, Andy Currid, May 1, 2004.

TCP Onloading for Data Center Servers, Computer, IEEE Computer Society, vol. 37, No. 11, pp. 48-58, Greg Regnier, et al., Nov. 2004.

*Declaration of Dr Gregory L Chesson in Alacritech v. Microsoft*, United States District Court, Northern District California, San Francisco Division, Gregory L. Chesson, Feb. 4, 2005.

Computing Research: A Looming Crisis, ACM Computer Communication Review, vol. 35, No. 2, Edward D. Lazowska and David A. Patterson, Jul. 2005.

Performance Characterization of a 10-Gigabit Ethernet TOE, Proceedings of the 13th Symposium on High Performance Interconnects, W. Feng, et al., Aug. 17, 2005.

User-level device drivers: Achieved performance, J. Comput. Sci. & Technol., vol. 20, B. Leslie, et al., Sep. 2005.

Head-to-TOE Evaluation of High-Performance Sockets Over Protocol Offload Engines, Proceedings of the IEEE International Conference on Cluster Computing, P. Balaji, et al., Sep. 2005.

SCTP versus TCP for MPI, Proceedings of the 2005 ACM/IEEE conference on Supercomputing, Seattle, p. 30, Washington, Humaira Kamal, et al., Nov. 12, 2005.

LTCP: Improving the Performance of TCP in Highspeed Networks, ACM Computer Communication Review, vol. 36, No. 1, pp. 41-50, Sumitha Bhandarkar, et al., Jan. 2006.

Zero-Copy TCP in Solaris, Proceedings of the USENIX Annual Technical Conference, H. K. Jerry Chu, Jan. 1996.

Reflections on Network Architecture: an Active Networking Perspective, ACM Computer Communication Review, vol. 36, No. 2, pp. 27-30, Ken Calvert, Apr. 2006.

10 Networking Papers: Recommended Reading, ACM Computer Communication Review, vol. 36, No. 2, pp. 51-52, Jon Crowcroft, Apr. 2006.

Flow labelled IP over ATM: design and rationale, ACM Computer Communication Review, vol. 36, No. 3, pp. 79-92, Greg Minshall, et al., Jul. 2006.

10 Networking Papers: Readings for Protocol Design, ACM Computer Communication Review, vol. 36, No. 3, pp. 77-78, David Wetherall, Jul. 2006.

A Critique of RDMA, HPCWire article: http://www.hpcwire.com/features/17886984.html,Patrick Geoffray, Aug. 18, 2006.

The NE010 iWARP Adapter, Open Fabrics Alliance, Gary Montry, May 2006.

Protocol Onload vs. Offload, Intel, Greg Regnier, Date Unknown.

Protocol Onloading vs. Offloading in High Performance Networks, Pacific Northwest Laboratories by Batelle for the U.S. Department of Energy, Fabrizio Petrini, Date Unknown.

Thoughts about TCP Offloading, My 2003 HotOS paper title: TCP Offload is a dumd idea whose time has to come, HP Labs (Not speaking for HP), Jeff Mogul, Aug. 2006.

Protocol Offloading vs. Onloading in High Performance Networks, Hot Interconnect Panel, System Interconnect Group, Qlogic Corporation, Lloyd Dickman CTO, Aug. 23, 2006.

Protocol off-loading vs. on-loading in high performance networks, Hot Interconnects, Myricom®, Patrick Geoffray, 2006.

Quantifying the Potential Benefit of Overlapping Communication and Computation in Large-Scale Scientific Applications, Proceedings of the 2006 ACM/IEEE conference on Supercomputing, Tampa, Florida, Jose Carlos Sancho, et al., Nov. 11, 2006.

High-Performance and Scalable MPI over InfiniBand with Reduced Memory Usage: An In-Depth Performance Analysis, Proceedings of the 2006 ACM/IEEE conference on Supercomputing, Tampa, Florida, Sayantan Sur, et al., Nov. 11, 2006.

10Gb/s Ethernet Performance and Retrospective, ACM Computer Communication Review, vol. 37, No. 2, pp. 89-92, Steven Pope and David Riddoch, Mar. 19, 2007.

Getting 10 Gb/s from Xen, Euro-Par Conference 2007, pp. 224-233, Rennes, France, Kieran Mansley, et al., Aug. 28, 2007.

The Parallel Protocol Engine, IEEE/ACM Transactions in Networking vol. 1, Issue 6, pp. 650-663, M. Kaiserswerth, Dec. 1993.

Use of message-based multicomputer components to construct gigabit networks, ACM Computer Communication Review, vol. 23, No. 4, p. 32-44, Danny Cohen, et al., Jul. 1993.

The End of History, IEEE TCGN Gigabit Networking Workshop, J. Evans and T. Buller, Apr. 22, 2001.

The Cambridge Model Distributed System, ACM SIGOPS Operating Systems Review, vol. 14, Issue 1, pp. 21-29, M.V. Wilkes and R.M. Needham, Jan. 1980.

Page 1 of WO 03/104943; High Performance IP Processor for TCP/IP, RDMA and IP Storage Applications; Dec. 18, 2003.

* cited by examiner

| SUB-PAGE ADDRESS | RESOURCE ID | THREAD TAG | ROW |
|---|---|---|---|
| 00F0 | 01A0 | 0010 | 1 |
| 00F2 | 01A1 | 0010 | 2 |
| 00F4 | 01A2 | 0011 | 3 |
| ⋮ | ⋮ | ⋮ | ⋮ |

Fig. 3

DYNAMIC RESOURCE ALLOCATION

PRIOR APPLICATION DATA

This application claims priority to PCT Application No. PCT/IB2005/002639, entitled Dynamic Resource Allocation which was published as WO 2006/027663 and which is entitled to a priority date of Sep. 9, 2004.

FIELD OF THE INVENTION

This invention relates to the configuration of resources for use in the operation of a device such as a network interface device.

SUMMARY

To overcome the drawbacks of the prior art and provide additional advantages, a network interface device is disclosed. In one embodiment the network interface is configured to provide an interface between a network and a data processing device. The network interface device has a plurality of resources of different types for supporting the interface and a bus interface. The bus interface is for interfacing with the data processing device by means of a bus over which data can be sent by addressing to an address on the bus. The network interface device is arranged so that each resource may be addressed by a respective address on the bus.

In one embodiment the network interface device further comprises a data store configured to store mapping data defining for each of the resources the respective address on the bus by which it may be addressed. It is contemplated that the mapping data can be changed whilst the network interface device is providing at least one of the said interfaces. In addition, the mapping data can be changed so as to change the address on the bus by which a resource may be addressed whilst the network interface device is providing an interface supported by that resource. In one embodiment the data store stores ownership data defining for each of the resources one or more entities that are permitted to modify the state of the respective resource. For example, the ownership data may be changed whilst the network interface device is providing an interface supported by that resource.

It is also contemplated that the network interface device may be arranged so as to restrict modification of the state of each resource by entities that are not defined by the ownership data as being permitted to modify the state of the respective resource. In one variation, the bus interface may be arranged to cause data received by the device over the bus and addressed to an address defined by the mapping data as being the address of a resource to be passed to that resource.

With regard to resources, the types of resources may include two or more of timers, resources for supporting queues of data to pass from the network device to the data processing device, and resources for supporting queues of data to pass from the data processing device to the network device. In one embodiment the network device further comprising a data processing device linked to the bus for communication with the data processing device such that the data processing device is arranged to allocate addresses on the bus in page blocks and more than one resource is individually addressable within a single page. Each page may be 4 kB or larger and multiple resources may be addressable within at least one page block of the bus.

Also disclosed herein is a program for controlling the operation of a data processing device for communication with a network device over a bus. In one embodiment, the program is arranged to receive a request for allocation of a resource on the bus and in response to such a request, identify a page block on the bus that has been allocated to the network device. The process identifies an unallocated address within that page to be allocated to the resource and transmits to the network device a message indicative of allocation of the resource and including the identified address.

Also disclosed herein is a network interface device for providing interfaces between a network and processes of a data processing device that is capable of supporting a plurality of processes such that each process has an identity code. In such a configuration, the network interface device is configured with a plurality of resources of different types for supporting the interface such that each resource may be capable of being allocated to a single one of the processes. This embodiment also comprises a data store configured to store mapping data defining for each of the resources the identity code of the process to which the resource is allocated.

In one embodiment, the network interface device has a resource security arrangement arranged to inhibit processes other than the one to which each resource is allocated from modifying the state of the respective resource. It is also contemplated that the resource security arrangement may be arranged to prevent processes other than the one to which each resource is allocated from modifying the state of the respective resource. The resource security arrangement may also be arranged for supporting a virtual memory mechanism whereby memory space of the data processing device can be mapped on to memory space of another data processing device. In addition, the resource security arrangement comprises a data processor arranged to process requests received by the network interface device to modify the state of a resource and this embodiment may further comprise an identity of a memory mapping according to the mechanism by accessing a data store to identify whether the resource is associated with that mapping and if it is not so associated preventing the request.

In one embodiment, the types of resources include two or more of timers, resources for supporting queues of data to pass from the network device to the data processing device, and resources for supporting queues of data to pass from the data processing device to the network device. It is also contemplated that the mapping data can be changed so as to change the address on the bus by which a resource may be addressed whilst the network interface device is providing at least one of the said interfaces.

Also disclosed is a network interface device for providing interfaces between a network and a data processing device. In this configuration, the network interface device has a plurality of resources of different types for supporting the interface such that each resource of one of the types being capable of communicating data to a respective resource of another of the types. This configuration also comprises a data store for storing mapping data defining one or more pairings of resources of different types between which communications are permitted.

In one variation, the mapping data can be varied while the network interface device is providing at least one of the said interfaces. It is contemplated that the network interface may have a resource security arrangement arranged to inhibit any resource for which mapping data defining a pairing with another resource is not stored, from altering the state of that other resource. In addition, the resource security arrangement arranged may be configured to prevent resources other than one(s) resource for which mapping data, defining a pairing with another resource is not stored, from altering the state of that other resource. The types of resources may comprise two or more of timers, resources for supporting queues of data to pass from the network device to the data processing device, and resources for supporting queues of data to pass from the data processing device to the network device.

According to one aspect of the present invention there is provided a network interface device for providing an interface between a network and a data processing device, the network interface device having: a plurality of resources of different types for supporting the interface, and a bus interface for interfacing with the data processing device by means of a bus over which data can be sent by addressing to an address on the bus, the network interface device being arranged so that each resource may be addressed by a respective address on the bus.

The network interface device may comprise a data store storing mapping data defining for each of the resources the respective address on the bus by which it may be addressed. The mapping data can preferably be changed whilst the network interface device is providing at least one of the said interfaces. The mapping data can preferably be changed so as to change the address on the bus by which a resource may be addressed whilst the network interface device is providing an interface supported by that resource. Preferably the data store stores ownership data defining for each of the resources one or more entities that are permitted to modify the state of the respective resource. If the device supports a memory mapping protocol then the data store may also store an indication of which mapping is associated with each resource. The ownership data may preferably be changed whilst the network interface device is providing an interface supported by that resource. The device may be arranged so as to restrict modification of the state of each resource by entities that are not defined by the ownership data as being permitted to modify the state of the respective resource. The state of the resource may include operational settings or configuration of the device (including pointers used by the resource) and/or (if available, for instance if the resource is active) the resource's running state (e.g a buffer of traffic data to be processed by the device, or the countdown value of a timer).

Preferably the bus interface is arranged to cause data received by the device over the bus and addressed to an address defined by the mapping data as being the address of a resource to be passed to that resource.

The types of resources preferably include two or more of timers, resources for supporting queues of data to pass from the network device to the data processing device, and resources for supporting queues of data to pass from the data processing device to the network device. Thus each resource may, for example, be a timer or a queue support device. Such a queue may be a buffer or a DMA queue.

According to a second aspect of the invention there is provided such a network device and a data processing device linked to the bus for communication with the data processing device, wherein the data processing device is arranged to allocate addresses on the bus in page blocks and more than one resource is individually addressable within a single page.

Each page may preferably be 4 kB or larger in size. Preferably multiple resources are addressable within at least one page block of the bus.

According to a third aspect of the present invention there is provided a program for controlling the operation of a data processing device for communication with a network device over a bus, the program being arranged to: receive a request for allocation of a resource on the bus; in response to such a request, identify a page block on the bus that has been allocated to the network device and identify an unallocated address within that page to be allocated to the resource; and transmit to the network device a message indicative of allocation of the resource and including the identified address.

According to a fourth aspect of the present invention there is provided network interface device for providing interfaces between a network and processes of a data processing device capable of supporting a plurality of processes, each process having an identity code, the network interface device having: a plurality of resources of different types for supporting the interface, each resource being capable of being allocated to a single one of the processes, and a data store storing mapping data defining for each of the resources the identity code of the process to which the resource is allocated.

The network interface may have a resource security arrangement arranged to inhibit processes other than the one to which each resource is allocated from modifying the state of the respective resource.

The resource security arrangement is preferably arranged to prevent processes other than the one to which each resource is allocated from modifying the state of the respective resource.

Preferably the resource security arrangement is arranged for supporting a virtual memory mechanism whereby memory space of the data processing device can be mapped on to memory space of another data processing device. The resource security arrangement may comprise a data processor arranged to process requests received by the network interface device to modify the state of a resource and comprising an identity of a memory mapping according to the mechanism by accessing a data store to identify whether the resource is associated with that mapping and if it is not so associated preventing the request. The operation of the virtual memory mechanism is suitably managed by hardware or software on each of the data processing devices.

Preferably the mapping data can be changed so as to change the address on the bus by which a resource may be addressed whilst the network interface device is providing at least one of the said interfaces.

According to a fifth aspect of the present invention there is provided a network interface device for providing interfaces between a network and a data processing device, the network interface device having: a plurality of resources of different types for supporting the interface, each resource of one of the types being capable of communicating data to a respective resource of another of the types, and a data store storing mapping data defining one or more pairings of resources of different types between which communications are permitted.

Preferably the mapping data can be varied whist the network interface device is providing at least one of the said interfaces. Preferably the network interface has a resource security arrangement arranged to inhibit any resource for which mapping data defining a pairing with another resource is not stored from altering the state of that other resource. Preferably the resource security arrangement arranged to prevent resources other than one(s) resource for which mapping data defining a pairing with another resource is not stored from altering the state of that other resource.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. The present invention will now be described by way of example only, with reference to the drawings.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
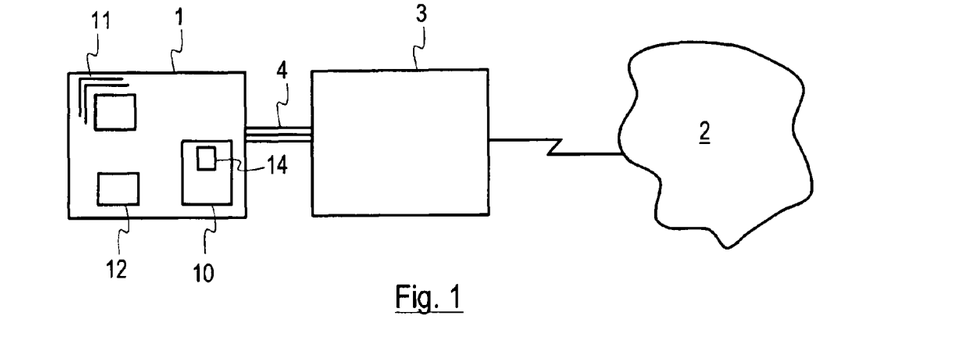
FIG. 1 shows the architecture of a networked system.

FIG. 1 shows the architecture of a computer 1 connected to a network 2 via a network interface card (NIC) 3. A bus 4, such as a PCI (personal computer interface) bus, connects the data processing components of the computer 1 to each other and to the NIC.

The computer runs an operating system 10 which is capable of supporting applications 11 also running on the computer. A library 12 of instructions is stored by the computer and available to the applications. The part of the library usable for communications with the NIC 3 is termed a transport library 13. Included in the operating system kernel is a driver component 14: a dedicated set of instructions which allow for data transfer and control-plane operations to be performed with the NIC.

In order to transfer data to and from the computer over the network a number of network-specific processing and data resources are needed. The resources that are needed depend on the network protocol that is in use, but they may include one or more timers (for identifying network protocol timeouts) and data queues (for transferring network data and instructions between the computer and the NIC). These resources are typically provided by dedicated elements of the NIC.

When an application wishes to establish a network connection it calls an establishment routine in the library 12. This instructs the kernel driver to signal the NIC to allocate a set of resources for use by the application. The composition of the set of resources that is needed to support a network connection is known to the designers of the system. Therefore, to allow the application to establish the connection through a single call to the library the composition of the set of resources that can be requested is fixed: it includes a fixed number of timers and a fixed number of queues of each type, which is sufficient to support the network connection that is required.

Address space on the bus 4 is typically allocated in pages of a fixed size: normally 4 or 8 kB. A page is allocated to the set of resources, with each resource having an individual address within that page.

This arrangement suffers from a number of problems. First, if the application wishes to have additional resources, for instance to support multiple processor threads, then it must request another complete set of resources, which will occupy another page of bus address-space. However, that may be wasteful since such an additional thread might not need the full set of resources. For example, the additional thread may not need certain resources such as a timer.

Second, resources that have been allocated even to a single thread and that are subsequently unwanted cannot be freed-up until the whole set to which they belong is released. This means that the NIC must have more resource capacity than might otherwise be necessary.

Third, it is problematic, or even impossible, to reallocate resources from one application or thread to another. This may be required, for example, if one thread wishes to pass ownership of a set of memory buffers to another.

There is a need for a system that addresses one or more of these problems.

Figure 2:
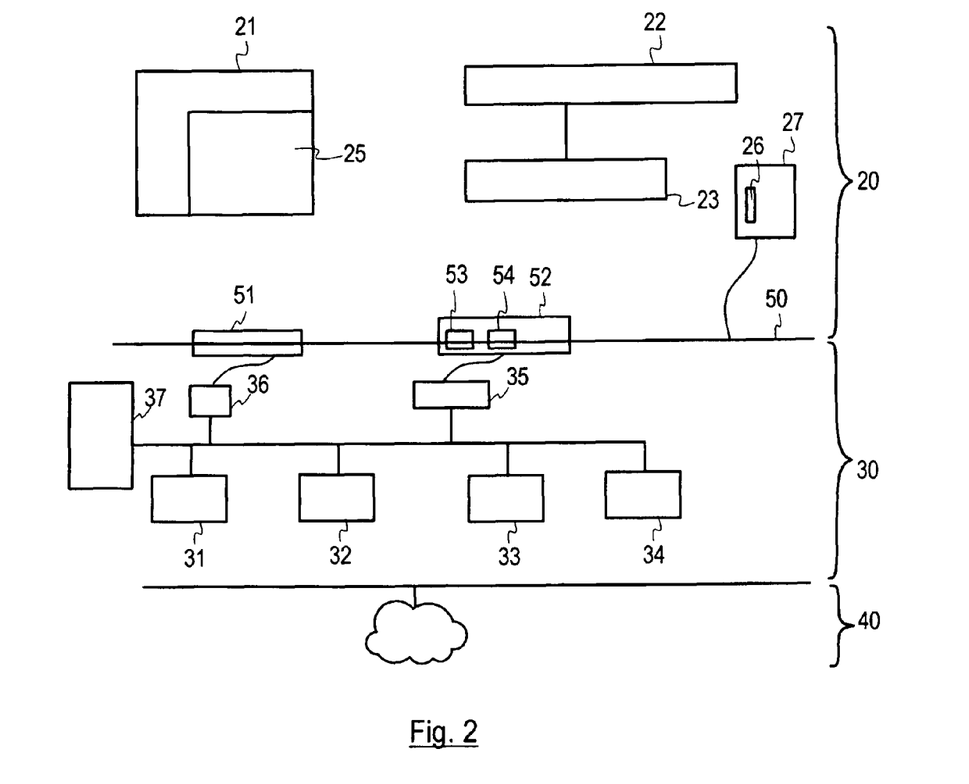
FIG. 2 shows the architecture of another networked system.

FIG. 2 shows a computing device 20 coupled to a network interface device 30 for connection to a network 40. The computer could be a personal computer or a server, or could be a non-reconfigurable processing device for which network connectivity is desired. The network interface device could be in any suitable form, for example a stand-alone device, a network interface card, which could be in the form of a peripheral card, or could be built on to a main circuit board of the computer. Purely for convenience the computing device will be referred to as a PC and the network interface device will be referred to as a NIC. The network could be an Ethernet network or another type of data network.

The computer runs an operating system 21 which is capable of supporting applications 22 also running on the computer. A library 23 of instructions is stored by the computer and available to the applications. The part of the library usable for communications with the NIC 30 is termed a transport library 24. Included in the operating system kernel is a driver component 25: a dedicated set of instructions which allow for data transfer with the NIC. Each application would normally take the form of a software program running on the computer, but it could be embedded in firmware. Some operating systems include applications in addition to fundamental operating system code.

Aspects of the system that are not described herein may be as set out in WO 2004/025477.

The NIC can support resources of a number of types: i.e. resources having capabilities of different natures. Examples include DMA queues, event queues, timers and support resources for remote apertures of the type described in WO 2004/025477. Each type of resource (31-34) is provided from a dedicated hardware resource pool which can support numerous instances of resources of the respective type. In order for such an instance to be made operational it must be configured by means of instructions from the PC, as will be described in more detail below.

The NIC communicates with the PC over a bus 50. In this example the bus is a PCI bus, but the invention is not limited to such a bus. Data transmitted over the PCI bus is associated with a destination address and is received by whichever entity that is connected to the bus has had that address allocated to it. In a typical PC implementation the addresses are allocated in pages of 4 or 8 kB. One or more of these pages may be allocated to the NIC. Blocks 51 and 52 represent allocated pages on the PCI bus.

Figure 3:
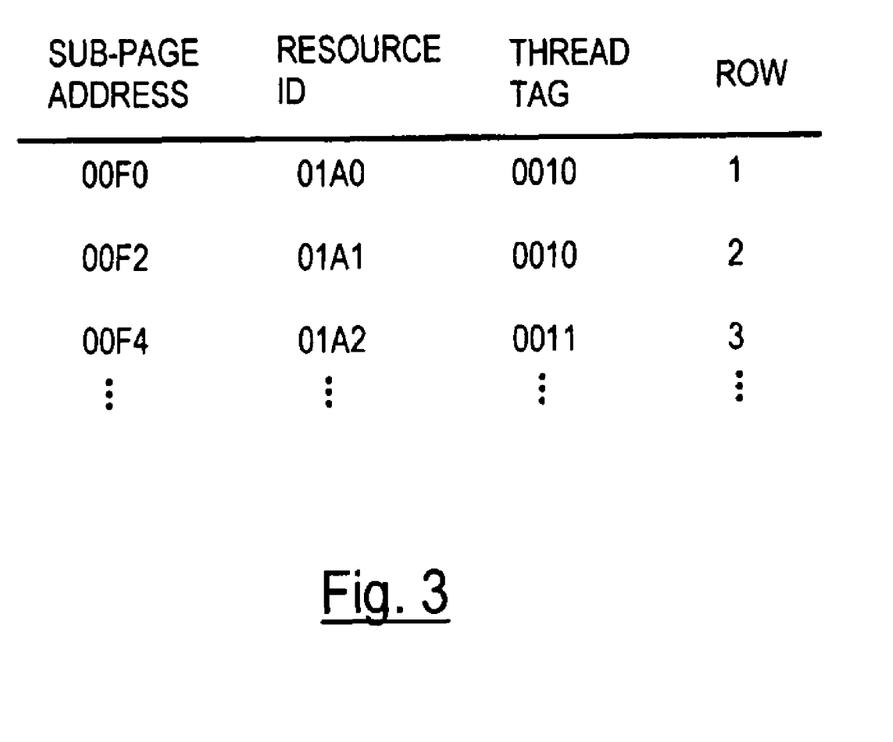
FIG. 3 illustrates a bus mapping table.

The NIC has a bus interface controller 35, a resource configuration unit 36 and a bus mapping table 37. The resource configuration unit processes communications received from the computer that provide instructions on the allocation, re-allocation and de-allocation of resources on the NIC, and configures the resources in accordance with such instructions. The driver 25 stores a record of which resources on the NIC are allocated. When a resource is to be allocated the driver 25 identifies a suitable free resource of the required type on the NIC and transmits an allocation instruction to the NIC. The instruction identifies the resource and specifies the details of how it is to be allocated, including details of the internal configuration of the resource (e.g. in the case of a timer the amount of time it is to run for). That instruction is passed to the resource configuration unit. The resource configuration unit then loads the specified configuration into the identified resource. The instruction also includes an ownership string, which may be an identification of which application or thread on the computer is using the resource. The resource configuration unit stores these in a row of the bus mapping table. An example of entries in the bus mapping table is shown in FIG. 3 and will be described in more detail below. When a resource is to be re-allocated the relevant entries in the resource's own configuration store and in the bus mapping table are altered as necessary. When a resource is to be de-allocated it is disabled and any rows of the bus mapping table that relate to it are deleted.

The operation of the system for the transfer of data to and from the network will now be described.

During set-up of the system one or more pages (51, 52) on the bus 50 have been allocated to the NIC. Part of this address space (page 51) can be used by the kernel driver 25 to send instructions to the NIC. Other pages (e.g. page 52) can be used for communication between applications such as application 22 and the resources 31-34. The resource allocation unit 36 stores a record of the pages that are allocated to the NIC for use by resources.

When an application 22 wishes to open a data connection over the network it calls a routine in the transport library to cause the NIC resources that are required for the connection to be allocated. Standard types of network connection require standard sets of resources; for example: an event queue, TX and RX DMA channels, and set of DMA'able memory buffers. For example a typical set may contain 1 TX and RX dma channel 2 timers and order 100 DMA memory buffers.

The transport library includes one or more routines that can be called directly by the application and that cause such standard sets of resources, including set numbers of resources of different types, to be allocated. The transport library also includes routines that allow a resource of each type to be allocated, re-allocated or de-allocated individually. The presence of both these types of instruction means that standard connections can be set up efficiently, and yet non-standard groups of resources can be created, and existing connections can be reconfigured on a resource-by-resource basis.

The routines for allocation of resources cause actions to be taken by the kernel driver 25 to communicate instructions to the NIC for the allocation of the resources as specified in the routines. Those instructions specify the identity of the application or thread with which the resources are to be associated, and the nature of the resources. The instructions are processed by the resource configuration unit 36 of the NIC. Some or all of the functions of the resource allocation unit may alternatively be provided by the kernel driver 25.

A significant feature of the present system is that the space on the bus 50 that is allocated to the NIC can be split dynamically between the resources on the bus 50. Once one or more pages 52 have been allocated to the NIC for use by resources those resources can be allocated one or more individual sub-page addresses within that page, corresponding to locations as illustrated at 53, 54. Thus each resource can have a part of the total space allocated to it. A record of which part of the total space is allocated to which resource is stored in the bus mapping table 37. The effect is that a single page of the bus can be used for communication to resources of multiple types and/or resources that relate to multiple connections and/or resources that are associated with multiple applications or threads on the computer 20. As a result, the total bus space can be used relatively efficiently.

The usage of the allocated bus space 52 is managed by the driver 25. When a resource is to be allocated the RAU identifies using a data store whose content it manages an unused block in the space on the bus that has already been allocated for use by resources of the NIC, the space being of the size required for the resource. It then stores in that data store the identity of the resource ("resource ID"), the address of the block within the allocated space ("sub-page ID), and the identity of the application or thread that is to use the resource ("thread tag"); and sends a message to the resource allocation unit (RAU) 36 to cause it to store corresponding data in the bus mapping table 37 (as shown in FIG. 3). If the RAU finds that table 37 indicates the address to be already occupied then it returns an error code to the driver. The sub-page address may need to be supplemented with the address of the page in which the sub-page lies if that cannot be inferred as a result of only a single page having been allocated for use by the resources. If the total space allocated for use by resources is insufficient then the kernel driver allocates it more space. Having allocated the resources, the RAU returns a success message to the kernel driver. The allocated page and sub-page addresses are returned to and mapped onto the application that requested the resources in order that it can access them by means of that data.

An application that has had resources allocated to it can access them by sending data (e.g. by means of load/store cycles through a virtual memory mapping) to the relevant bus page, at the sub-page address corresponding to the respective resource. Any data sent to pages allocated to resources is picked off the bus 50 by the bus interface controller 35. It directs that data to the appropriate one of the resources 31-34 by performing a look-up in the table 37 to identify the identity of the resource to which the sub-page address has been allocated. An application can also access a resource by means other than a bus write: for example by means of direct memory access (DMA). In those instances, the NIC checks that the identity of the application/thread from which the access has been received matches the identity indicated in the table 37 for the resource. If it does not match, the data is ignored. If it matches, it is passed to the relevant resource. This adds to security and helps to prevent corruption of the resources by other applications.

The set of resources allocated to an application or thread may be considered to constitute a virtual network interface (VNIC).

Once a virtual interface has been composed, it may be reconfigured dynamically. Examples of the actions that may be taken are as follows: A resource that is no longer required may be freed-up. To achieve this the application using the resource calls a de-allocation routine in the transport library 23. The de-allocation routine calls the kernel driver 25, which instructs the RAU to de-allocate the resource by disabling it, clearing its status and deleting its row in the table 37.

Additional resources may be added to the VNIC. (etc) The process is analogous to that described above for initial composition of the VNIC.

Resources may be passed from one application or thread to another. This is most useful in the situation where a single application has multiple threads and wants to pass control of a resource from on thread to another, for example if data from the network is to be received into and processed by a new thread. To achieve this the application using the resource calls a re-allocation routine in the transport library 23. The re-allocation routine calls the kernel driver 25, which instructs the RAU to re-allocate the resource modifying its row in the table 37 to specify the identity of the application or thread that is taking over its control.

In some instances it may be desirable for resources of one type to communicate with resources of another type. For example, data received from the network 40 may be being passed to an application 22 for processing. The application has a queue 26 in a memory 27 connected to the bus 50. The queue is managed in part by the transport library 23, which provides a DMA queue resource 31 on the NIC with an up-to-date pointer to the next available location on the queue 26. This is updated as the application reads data from the queue 26. When data is received from the network it is passed to an event queue resource 32, which writes it to the location identified by the pointer and also triggers an event such as an interrupt on the computing device 20 to indicate that data is available on the queue. In order for this to happen the event queue resource 32 must learn the pointer details from the DMA queue resource 31. This requires data to be passed from the DMA queue resource to the event queue resource.

To achieve this the "thread tag" column of the table 37 can be treated more generally as an ownership tag, and can link the DMA queue to the related event queue. To achieve this the ownership tag of the event queue can be set to the identity of the related DMA queue. When the DMA queue needs to pass data to the related event queue it can identify the event queue from the table 37 by performing a look-up on its own identity in the ownership tag column.

Data intended to be passed from one resource to another can be checked by the bus controller 35 to ensure that it is compatible with the settings in the table 37. Specifically, when data is to be sent from one resource to another the bus controller can check that there is a row in the table 37 that has the identity of the resource that is the source of the data in the ownership tag field, and the identity of the resource that is the intended destination of the data in the resource ID field. If there is no match then the data is prevented from reaching its destination. This provides additional security and protection against corruption. Alternatively, or in addition, it may be permitted for one resource to transmit data to another if both are in common ownership: in this example if their resource ID fields indicate that they are owned by the same thread, application or other resource.

The identities of resources linked in this way can also be reconfigured dynamically by means of the re-configuration routines in the transport library.

The network may be an Ethernet network or another type of network. Protocols used on the network may include, but are not limited to, TCP/IP.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention. In addition, the various features, elements, and embodiments described herein may be claimed or combined in any combination or arrangement.

We claim:

1. A network interface device for providing at least one interface between a network and a data processing device, the network interface device having:
    a bus interface for interfacing with the data processing device by means of a bus over which data can be sent by addressing to an address on the bus;
    a plurality of resources of different types for supporting the interface, each of the resources addressable on the bus within an address page that is allocated to the network interface device;
    a data store storing mapping data defining for each of the resources the respective address on the bus and an associated resource identifier; and
    a resource configuration unit configured to dynamically configure one or more of the resources in dependence on an instruction received from the data processing device, wherein the resource configuration unit is operable to re-allocate a resource to an address within the address page by altering a subset of the mapping data identifying that resource.

2. The network interface device as claimed in claim 1, wherein the mapping data can be changed so as to change the address on the bus by which a resource may be addressed whilst the network interface device is providing an interface supported by that resource.

3. The network interface device as claimed in claim 1, wherein the data store stores ownership data defining for each of the resources one or more entities that are permitted to modify the state of the respective resource.

4. The network interface device as claimed in claim 3, wherein the ownership data may be changed whilst the network interface device is providing an interface supported by that resource.

5. The network interface device as claimed in claim 3, wherein the device is arranged so as to restrict modification of the state of each resource by entities that are not defined by the ownership data as being permitted to modify the state of the respective resource.

6. The network interface device as claimed in claim 1, wherein the bus interface is arranged to cause data received by the device over the bus and addressed to an address defined by the mapping data as being the address of a resource to be passed to that resource.

7. The network interface device as claimed in claim 1, wherein the types of resources include two or more of timers, resources for supporting queues of data to pass from the network device to the data processing device, and resources for supporting queues of data to pass from the data processing device to the network device.

8. The network interface device as claimed in claim 1, addresses on the bus are allocated in page blocks and more than one resource is individually addressable within a single page.

9. The network interface device and a data processing device as claimed in claim 8, wherein each page is 4 kB or larger.

10. The network interface device and a data processing device as claimed in claim 9, wherein multiple resources are addressable within at least one page block of the bus.

11. A network interface device for providing interfaces between a network and a plurality of processes of a data processing device capable of supporting the plurality of processes, each process having an identity code, the network interface device having:
    a bus interface for interfacing with a data processing device by means of a bus over which data can be sent by addressing to an address on the bus;
    a plurality of resources of different types for supporting the interface, each resource being capable of being allocated to a single one of the plurality of processes, and each resource further being addressable on the bus within an address page that is allocated to the network interface device;
    a data store storing mapping data defining for each of the resources the identity code of the process to which the resource is allocated along an associated resource identifier and an address on the bus by which the resource may be addressed; and a resource configuration unit configured to dynamically configure one or more of the resources in dependence on an instruction received from the process to which the resource to be configured is allocated, wherein the resource configuration unit is operable to re-allocate a resource to an address within the address page by altering a subset of the mapping data identifying that resource.

12. The network interface device as claimed in claim 11, wherein the network interface has a resource security arrangement arranged to inhibit processes other than the one to which each resource is allocated from modifying the state of the respective resource.

13. The network interface device as claimed in claim 12, wherein the resource security arrangement arranged to prevent processes other than the one to which each resource is allocated from modifying the state of the respective resource.

14. The network interface device as claimed in claim 13, wherein the resource security arrangement is arranged for supporting a virtual memory mechanism whereby memory space of the data processing device can be mapped on to memory space of another data processing device, and the resource security arrangement comprises a data processor arranged to process requests received by the network interface device to modify the state of a resource and comprising an identity of a memory mapping according to the mechanism by accessing a the data store to identify whether the resource is associated with that mapping and if it is not so associated preventing the request.

15. The network interface device as claimed in claim 11, wherein the types of resources include two or more of timers, resources for supporting queues of data to pass from the network device to the data processing device, and resources for supporting queues of data to pass from the data processing device to the network device.

16. The network interface device as claimed in claim 11, wherein the mapping data can be changed so as to change the address on the bus by which a resource may be addressed whilst the network interface device is providing at least one of the said interfaces.

17. A network interface device for providing interfaces between a network and a data processing device, the network interface device having:
   a bus interface for interfacing with a data processing device by means of a bus over which data can be sent by addressing to an address on the block;
   a plurality of resources of different types for supporting the interface, each resource of one of the types being configured to communicate data to a respective resource of another of the types and each resource further being addressable on the bus within an address page that is allocated to the network interface device;
   a data store storing mapping data defining one or more pairings of resources of different types between which communications are permitted along an associated resource identifier and an address on a bus by which one of the resources in a resource pairing may be addressed; and
   a resource reconfiguration unit configured to dynamically configure one or more of the resources in dependence on an instruction received from the data processing device wherein the resource configuration unit is operable to re-allocate a resource to an address within the address page by altering a subset of the mapping data identifying that resource.

18. The network interface device as claimed in claim 17, wherein the network interface has a resource security arrangement arranged to inhibit any resource for which mapping data defining a pairing with another resource is not stored from altering the state of that other resource.

19. The network interface device as claimed in claim 18, wherein the resource security arrangement arranged to prevent resources other than one(s) resource for which mapping data defining a pairing with another resource is not stored from altering the state of that other resource.

20. The network interface device as claimed in claim 17, wherein the types of resources include two or more of timers, resources for supporting queues of data to pass from the network device to the data processing device, and resources for supporting queues of data to pass from the data processing device to the network device.

* * * * *